US012430875B2

(12) United States Patent
Chen et al.

(10) Patent No.: US 12,430,875 B2
(45) Date of Patent: Sep. 30, 2025

(54) IMAGE PROCESSING METHOD AND ELECTRONIC DEVICE

(71) Applicant: Huawei Technologies Co., Ltd., Shenzhen (CN)

(72) Inventors: Bin Chen, Shenzhen (CN); Congchao Zhu, Shenzhen (CN); Yuanyou Li, Oerlikon (CH)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 436 days.

(21) Appl. No.: 17/914,141

(22) PCT Filed: Mar. 16, 2021

(86) PCT No.: PCT/CN2021/080990
§ 371 (c)(1),
(2) Date: Sep. 23, 2022

(87) PCT Pub. No.: WO2021/190348
PCT Pub. Date: Sep. 30, 2021

(65) Prior Publication Data
US 2023/0043815 A1 Feb. 9, 2023

(30) Foreign Application Priority Data
Mar. 26, 2020 (CN) .......................... 202010225392.7

(51) Int. Cl.
G06K 9/00 (2022.01)
G06V 10/60 (2022.01)
H04N 7/01 (2006.01)
H04N 19/132 (2014.01)

(52) U.S. Cl.
CPC ........... *G06V 10/60* (2022.01); *H04N 7/0127* (2013.01); *H04N 19/132* (2014.11)

(58) Field of Classification Search
CPC .... G06V 10/60; H04N 19/132; H04N 7/0127; H04N 19/172; H04N 23/631; H04N 23/6811; H04N 23/71; H04N 23/73; H04N 23/951
See application file for complete search history.

(56) References Cited

U.S. PATENT DOCUMENTS

2004/0218830 A1 11/2004 Kang et al.
2004/0246374 A1 12/2004 Mishima et al.
2006/0023788 A1 2/2006 Otsuka et al.
(Continued)

FOREIGN PATENT DOCUMENTS

CN 1592398 A 3/2005
CN 1728832 A 2/2006
(Continued)

*Primary Examiner* — Avinash Yentrapati
(74) *Attorney, Agent, or Firm* — Conley Rose, P.C.

(57) ABSTRACT

An image processing method includes an electronic device that outputs a first frame rate when the electronic device detects that ambient light brightness in a current environment is less than or equal to a first preset light brightness threshold; collects first video data based on the first frame rate, where the first video data includes a plurality of frames of images; and performs frame interpolation on the frames of images to obtain and store second video data, where a frame rate of the second video data is greater than the first frame rate.

20 Claims, 11 Drawing Sheets

(56) References Cited

U.S. PATENT DOCUMENTS

| | | | |
|---|---|---|---|
| 2009/0022411 A1 | 1/2009 | Inoue et al. | |
| 2009/0147122 A1 | 6/2009 | Kato | |
| 2013/0176447 A1 | 7/2013 | Nakashima | |
| 2015/0172622 A1 | 6/2015 | Yoon et al. | |
| 2015/0373293 A1* | 12/2015 | Vance | H04N 19/132 |
| | | | 348/143 |
| 2016/0249012 A1* | 8/2016 | Wang | H04N 7/0127 |
| 2017/0032504 A1* | 2/2017 | Lai | H04N 23/73 |
| 2018/0234603 A1* | 8/2018 | Moore | A61B 5/0075 |
| 2020/0344398 A1* | 10/2020 | Fruchtman | H04N 23/745 |
| 2021/0185337 A1 | 6/2021 | Ahn | |
| 2021/0274251 A1 | 9/2021 | Wang | |
| 2023/0043815 A1 | 2/2023 | Chen et al. | |

FOREIGN PATENT DOCUMENTS

| | | |
|---|---|---|
| CN | 1799057 A | 7/2006 |
| CN | 104580969 A | 4/2015 |
| CN | 104715728 A | 6/2015 |
| CN | 106412451 A | 2/2017 |
| CN | 107340986 A | 11/2017 |
| CN | 108762465 A | 11/2018 |
| CN | 109640168 A | 4/2019 |
| CN | 109922372 A | 6/2019 |
| CN | 110392282 A | 10/2019 |
| CN | 2020005042 A1 | 1/2020 |
| CN | 112333397 A | 2/2021 |
| EP | 0986262 A2 | 3/2000 |
| WO | 2019072370 A1 | 4/2019 |

* cited by examiner

IMAGE PROCESSING METHOD AND ELECTRONIC DEVICE

CROSS-REFERENCE TO RELATED APPLICATIONS

This is a U.S. National Stage of International Patent Application No. PCT/CN2021/080990 filed on Mar. 16, 2021, which claims priority to Chinese Patent Application No. 202010225392.7 filed on Mar. 26, 2020. Both of the aforementioned applications are hereby incorporated by reference in their entireties.

TECHNICAL FIELD

This application relates to the field of terminals, and more specifically, to an image processing method and an electronic device.

BACKGROUND

When light is sufficient, most photographing devices can shoot videos with good picture quality. However, in a dark situation, due to limitation of ambient brightness and photosensitivity of a device, fluency of a shot image is usually poor.

SUMMARY

This application provides an image processing method and an electronic device, to help improve fluency of an image shot by an electronic device in a dark scenario.

According to a first aspect, an image processing method is provided. The method is applied to an electronic device having a camera, and the method includes: A sensor of the electronic device outputs a first frame rate when the electronic device detects that ambient light brightness in a current environment is less than or equal to a first preset light brightness threshold; the electronic device collects first video data based on the first frame rate by using the camera, where the first video data includes a plurality of frames of images; and the electronic device performs frame interpolation on the plurality of frames of images, to obtain and store second video data, where a frame rate of the second video data is greater than the first frame rate.

According to the image processing method in this embodiment of this application, when the electronic device currently detects that light brightness is relatively low, the electronic device may perform frame interpolation on collected video data, so that a frame rate of a finally obtained video is greater than a frame rate at which the sensor of the electronic device outputs frames. This can improve video fluency.

With reference to the first aspect, in some implementations of the first aspect, the method further includes: The sensor of the electronic device outputs a second frame rate when the electronic device detects that the ambient light brightness in the current environment is greater than or equal to a second preset light brightness threshold, where the second frame rate is greater than the first frame rate; the electronic device collects third video data based on the second frame rate by using the camera, where a frame rate of the third video data is equal to the second frame rate; and the electronic device stores the third video data.

In this embodiment of this application, when the electronic device detects that light brightness is greater than the second preset light brightness threshold, a frame rate may be improved, to ensure fluency of collected video data.

With reference to the first aspect, in some implementations of the first aspect, the second preset light brightness threshold is greater than the first preset light brightness threshold.

In this embodiment of this application, two thresholds are set, to reduce various sudden changes caused when ambient light brightness changes at a critical point, for example, sudden changes of image brightness and noise caused by a sudden decrease of exposure duration. Frame dropping is performed when the light brightness is less than or equal to the first light brightness threshold, and frame dropping is stopped when the light brightness is greater than or equal to the second light brightness threshold. This ensures flapping between frame dropping and no frame dropping.

With reference to the first aspect, in some implementations of the first aspect, the plurality of frames of images include an $a^{th}$ frame of image data and an $(a+1)^{th}$ frame of image data, the $a^{th}$ frame of image data and the $(a+1)^{th}$ frame of image data each are a W×Z matrix, and a, W, and Z are positive integers. That the electronic device performs frame interpolation on the plurality of frames of images includes: The electronic device determines L sum of absolute differences SAD values based on a sum of pixel values in each row in an $M^{th}$ row to an $N^{th}$ row in the $(a+1)^{th}$ frame of image data and a sum of pixel values in each row in a $k^{th}$ row to a $(k+N-M)^{th}$ row in the a frame of image data, where M and N are positive integers, $1 \leq M < N \leq W$, $k=1, \ldots,$ or L, and L is a maximum row offset; the electronic device determines Y SAD values based on a sum of pixel values in each column in a $P^{th}$ column to a $Q^{th}$ column in the $(a+1)^{th}$ frame of image data and a sum of pixel values in each column in an $x^{th}$ column to an $(x+Q-p)^{th}$ column in the $a^{th}$ frame of image data, where P and Q are positive integers, $1 \leq P < Q \leq Z$, $x=1, \ldots,$ or Y, and Y is a maximum column offset; the electronic device determines a row offset and a column offset based on the L SAD values and the Y SAD values; the electronic device processes the $a^{th}$ frame of image data or the $(a+1)^{th}$ frame of image data based on the row offset and the column offset, to obtain processed image data; and the electronic device interpolates the processed image data between the $a^{th}$ frame of image data and the $(a+1)^{th}$ frame of image data.

In this embodiment of this application, the row offset and the column offset are determined by calculating SAD values of some rows and columns in the $a^{th}$ frame of image data and the $(a+1)^{th}$ frame of image data, the $a^{th}$ frame of image data or the $(a+1)^{th}$ frame of image data is processed based on the row offset and the column offset, and the processed image data is interpolated between the $a^{th}$ frame of image data and the $(a+1)^{th}$ frame of image data, so that a frame rate of the processed image data can be improved, and fluency of a video can be improved.

With reference to the first aspect, in some implementations of the first aspect, that the electronic device determines a row offset and a column offset based on the L SAD values and the Y SAD values includes: The electronic device determines a row offset corresponding to a smallest value in the L SAD values as the row offset; and the electronic device determines a column offset corresponding to a smallest value in the Y SAD values as the column offset.

With reference to the first aspect, in some implementations of the first aspect, before the processed image data is obtained, the method further includes: The electronic device performs edge supplement on data obtained after offset.

In this embodiment of this application, before the processed image data is obtained, edge supplement may be performed on the data obtained after offset, to improve picture quality of an image obtained after frame interpolation, and avoid a white edge of the image obtained after frame interpolation.

In some possible implementations, that the electronic device processes the $a^{th}$ frame of image data or the $(a+1)^{th}$ frame of image data based on the row offset and the column offset, to obtain processed image data includes: The electronic device performs offset on the $(a+1)^{th}$ frame of data based on the row offset and the column offset, to obtain frame data obtained after offset; and the electronic device performs edge supplement on the data obtained after offset, to obtain the processed image data.

In some possible implementations, that the electronic device processes the $a^{th}$ frame of image data or the (a+1)th frame of image data based on the row offset and the column offset, to obtain processed image data includes: The electronic device performs reverse offset on the $a^{th}$ frame of data based on the row offset and the column offset, to obtain frame data obtained after offset; and the electronic device performs edge supplement on the data obtained after offset, to obtain the processed image data.

According to a second aspect, this technical solution provides an image processing apparatus. The apparatus is included in an electronic device, and the apparatus has a function of implementing behavior of the first electronic device in the first aspect and the possible implementations of the first aspect. The function may be implemented by using hardware, or may be implemented by using hardware executing corresponding software. The hardware or the software includes one or more modules or units corresponding to the foregoing functions.

According to a third aspect, an electronic device is provided, including one or more processors and one or more memories. The one or more memories are coupled to the one or more processors. The one or more memories are configured to store computer program code. The computer program code includes computer instructions. When the one or more processors execute the computer instructions, the electronic device is enabled to perform the image processing method in any one of the possible implementations of the first aspect.

According to a fourth aspect, a technical solution provides a computer storage medium, including computer instructions. When the computer instructions are run on an electronic device, the electronic device is enabled to perform the service recommendation method in any one of the first aspect and the possible implementations of the first aspect.

According to a fifth aspect, a technical solution provides a computer program product. When the computer program product runs on an electronic device, the electronic device is enabled to perform the service recommendation method in any one of the first aspect and the possible implementations of the first aspect.

DESCRIPTION OF EMBODIMENTS

The following describes technical solutions in embodiments of this application with reference to the accompanying drawings in embodiments of this application. In the descriptions of embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of embodiments of this application. "plural" or "a plurality of" refers to two or more.

The terms "first" and "second" mentioned below are merely intended for a purpose of description, and shall not be understood as an indication or implication of relative importance or implicit indication of a quantity of indicated technical features. Therefore, a feature limited by "first" or "second" may explicitly indicate or implicitly include one or more such features. In the description of embodiments, unless otherwise specified, "a plurality of" means two or more than two.

A method provided in embodiments of this application may be applied to an electronic device such as a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA). A specific type of the electronic device is not limited in embodiments of this application.

Figure 1:
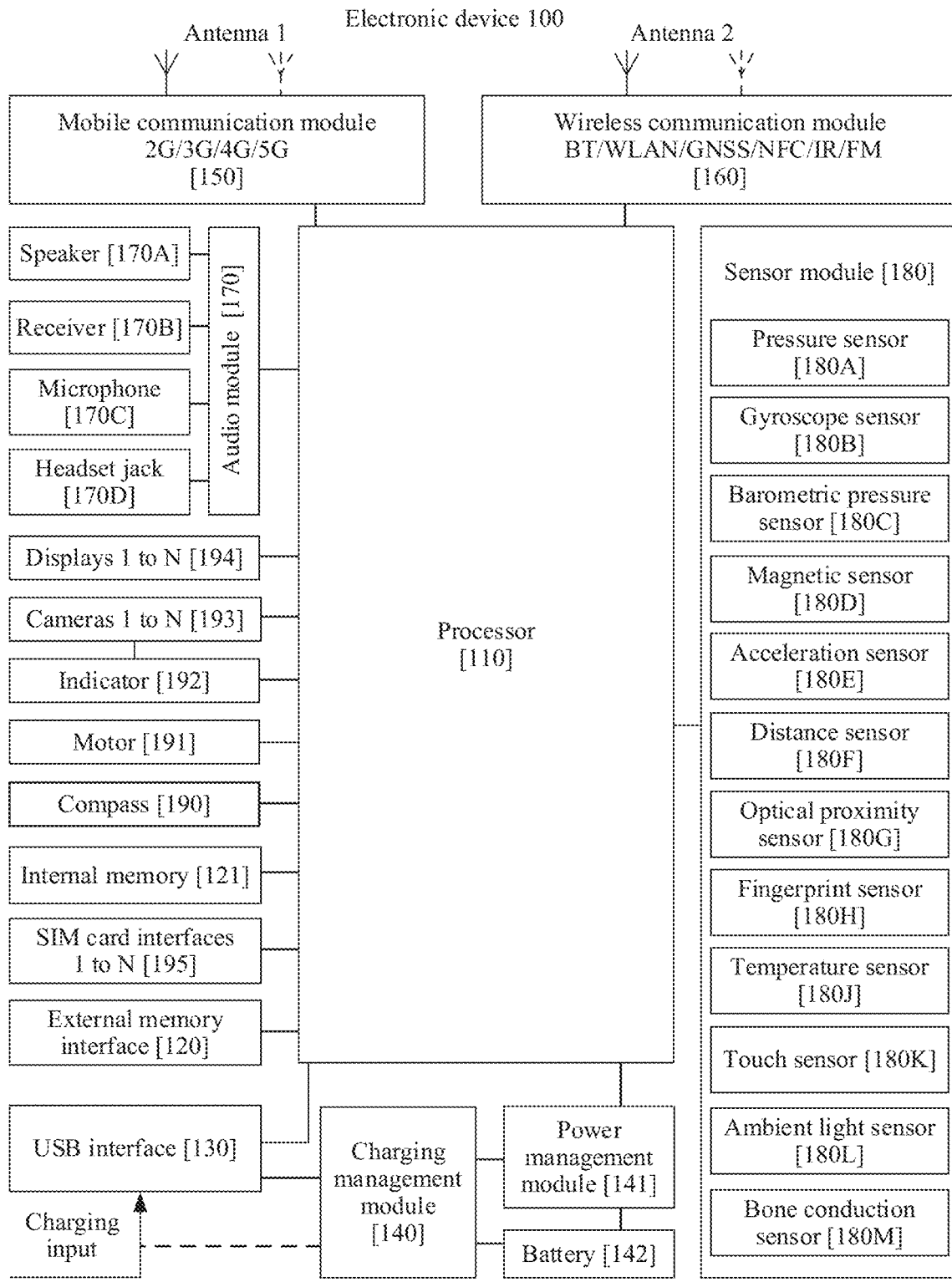
FIG. 1 is a schematic diagram of a structure of an electronic device according to an embodiment of this application.

For example, FIG. 1 is a schematic diagram of a structure of an electronic device 100. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

The controller may be a nerve center and a command center of the electronic device 100. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (derail clock line, SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call by using a Bluetooth headset.

The PCM interface may also be used for audio communication, and analog signal sampling, quantization, and coding. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is used for asynchronous communication. The bus may be a two-way communication bus. The bus converts to-be-transmitted data between serial communication and parallel communication. In some embodiments, the UART interface is usually used to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI, to implement an image shooting function of the electronic device 100. The processor 110 communicates with the display 194 through the DSI, to implement a display function of the electronic device 100.

The GPIO interface may be configured by using software. The GPIO interface may be configured as a control signal, or may be configured as a data signal. In some embodiments, the GPIO interface may be configured to connect the processor 110 to the camera 193, the display 194, the wireless communication module 160, the audio module 170, the sensor module 180, or the like. The GPIO interface may be further configured as the I2C interface, the I2S interface, the UART interface, the MIPI interface, or the like.

The USB interface 130 is an interface that conforms to a USB standard specification, and may be specifically a mini USB interface, a micro USB interface, a USB Type C interface, or the like. The USB interface 130 may be configured to connect to a charger to charge the electronic device 100, or may be configured to transmit data between the electronic device 100 and a peripheral device, or may be configured to connect to a headset, to play audio by using the headset. The interface may be further configured to connect to another electronic device such as an AR device.

It may be understood that an interface connection relationship between the modules that is shown in this embodiment of this application is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The power management module 141 is configured to connect the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communication module 160, and the like. The power management module 141 may be further configured to monitor parameters such as a battery capacity, a battery cycle count, and a battery state of health (electric leakage and impedance). In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communication module 150 may provide a solution for wireless communication, including 2G/3G/4G/5G and the like, that is applied to the electronic device 100.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal.

The wireless communication module 160 may provide a wireless communication solution that is applied to the electronic device 100, and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared. IR) technology, or the like.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communication technology.

The electronic device 100 implements a display function through the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode. FLED), a mini-LED, a micro-LED, a micro-OLED, a quantum dot light emitting diode (quantum dot light emitting diode, QLED), or the like. In some embodiments, the electronic device 100 may include one or N displays 194, where N is a positive integer greater than 1.

The electronic device 100 can implement an image shooting function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of an image shooting scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to: compress or decompress a digital video. The electronic device 100 may support one or more types of video codecs. Therefore, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information with reference to a structure of a biological neural network, for example, a transfer mode between human brain neurons, and may further continuously perform self-learning. Applications such as intelligent cognition of the electronic device 100, for example, image recognition, facial recognition, speech recognition, and text understanding, may be implemented through the NPU.

The external memory interface 120 may be used to connect to an external storage card, for example, a micro SD card, to extend a storage capability of the electronic device 100.

The internal memory 121 may be configured to store computer-executable program code. The executable program code includes instructions. The processor 110 implements various function applications and data processing of the electronic device 100 by running the instructions stored in the internal memory 121. The internal memory 121 may include a program storage area and a data storage area. The program storage area may store an operating system, an application required by at least one function (for example, a sound playing function or an image playing function), and the like. The data storage area may store data (such as audio data and an address book) and the like that are created during use of the electronic device 100. In addition, the internal memory 121 may include a high-speed random access memory, and may further include a nonvolatile memory, for example, at least one magnetic disk storage device, a flash memory device, or a universal flash storage (universal flash storage, UFS).

The electronic device 100 may implement an audio function, for example, music playing and recording, through the audio module 170, the speaker 170A, the receiver 170B, the microphone 170C, the headset jack 170D, the application processor, and the like.

The pressure sensor 180A is configured to sense a pressure signal, and can convert the pressure signal into an electrical signal.

The gyroscope sensor 180B may be configured to determine a motion posture of the electronic device 100.

The barometric pressure sensor 180C is configured to measure barometric pressure.

The magnetic sensor 180D includes a Hall sensor. The electronic device 100 may detect opening and closing of a flip cover by using the magnetic sensor 180D.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between landscape mode and portrait mode or a pedometer.

The distance sensor 180F is configured to measure a distance. The electronic device 100 may measure a distance in an infrared manner or a laser manner. In some embodiments, in an image shooting scenario, the electronic device 100 may measure a distance by using the distance sensor 180F, to implement quick focusing.

The optical proximity sensor 180G may include a light-emitting diode (LED) and an optical detector, for example, a photodiode.

The ambient light sensor 180L is configured to sense ambient light brightness.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 1803.

The touch sensor 180K is also referred to as a "touch panel". The touch sensor 180K may be disposed on the display 194, and the touch sensor 180K and the display 194 form a touchscreen, also referred to as a "touch screen". The bone conduction sensor 180M may obtain a vibration signal. A software system of the electronic device 100 may use a layered architecture, an event-driven architecture, a microkernel architecture, a micro service architecture, or a cloud architecture.

In this embodiment of this application, an Android system of a layered architecture is used as an example to illustrate the software structure of the electronic device 100.

Figure 2:
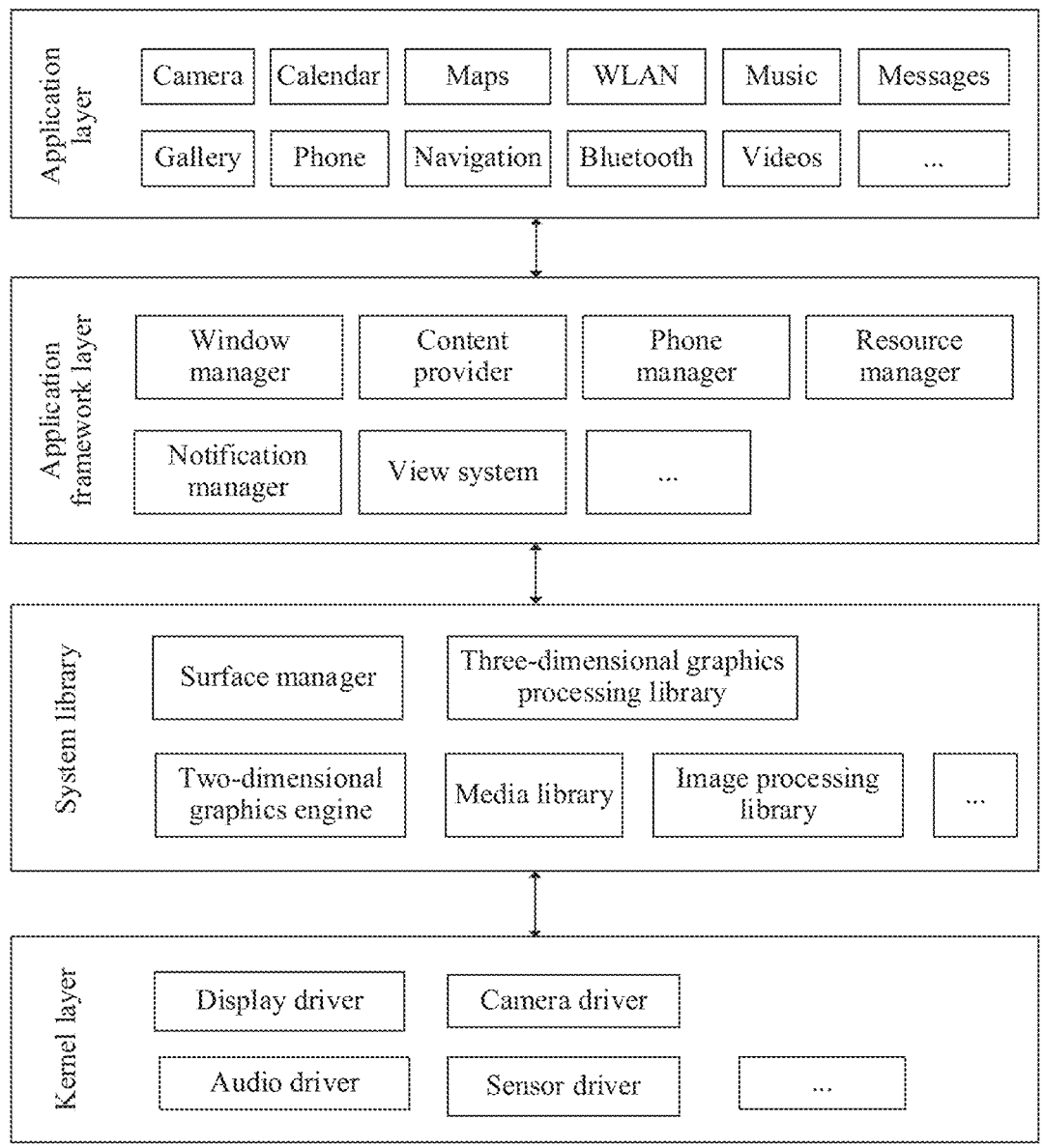
FIG. 2 is a block diagram of a software structure of an electronic device according to an embodiment of this application.

FIG. 2 is a block diagram of a software structure of the electronic device 100 according to an embodiment of this application. In a layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom. The application layer may include a series of application packages.

As shown in FIG. 2, the application packages may include applications such as Camera, Gallery, Calendar, Phone, Maps, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying an image. The view system may be configured to construct an application. A display interface may include one or more views. For example, a display interface including a notification icon of Messages may include a text display view and an image display view.

The phone manager is configured to provide a communication function of the electronic device 100, for example, management of a call status (including answering, declining, or the like).

The resource manager provides, for an application, various resources such as a localized character string, an icon, an image, a layout file, and a video file.

The notification manager enables an application to display notification information in the status bar, and may be configured to transmit a notification-type message. The displayed information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The kernel library includes two parts: a function that needs to be called in Java language, and a kernel library of Android.

The application layer and the application framework layer run on a virtual machine. The virtual machine executes Java files at the application layer and the application framework layer as binary files. The virtual machine is configured to perform functions such as object lifecycle management, stack management, thread management, security and exception management, and garbage collection.

The system library may include a plurality of functional modules, for example, a surface manager (surface manager), a media library (media library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playing and recording of a plurality of commonly used audio and video formats, static image files, and the like. The media library may support a plurality of audio and video coding formats, such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

For a human eye, only a video with a frame rate greater than 24 fps can provide fluent visual experience. Therefore, a device needs to keep fluency greater than 24 fps to satisfy people. Currently, a mainstream video output frame rate is 30 fps. In this case, maximum exposure duration of a video source is 33 ms. If a video with a frame rate less than 24 fps is output, for example, a video of 15 fps is output, maximum exposure may be increased to 66.67 ms. Compared with that of 30 fps, exposure duration is directly doubled. In a same photosensitive condition, the exposure duration is doubled. In this case, brightness, definition, noise, and a color of the video are all greatly improved. However, video freeze is very obvious at 15 fps. This is unacceptable to a common user.

To make full use of an exposure duration increase brought by a frame rate reduction, an embodiment of this application provides an image processing method, to improve a video output frame rate and enhance video fluency, so that the video fluency is acceptable to a user.

Figure 3:
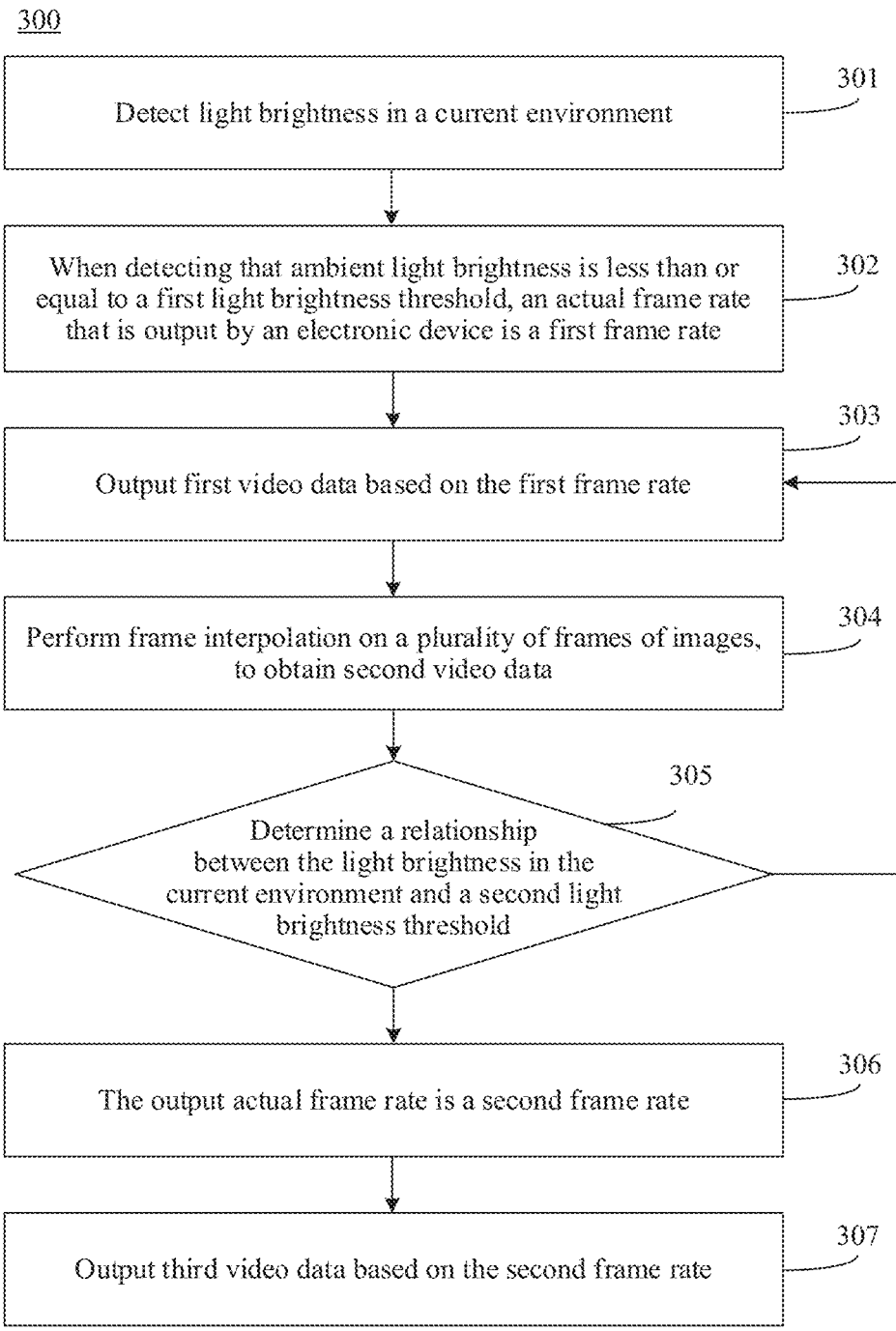
FIG. 3 is a schematic flowchart of an image processing method according to an embodiment of this application.

FIG. 3 is a schematic flowchart of an image processing method 300 according to an embodiment of this application. As shown in FIG. 3, the method 300 includes the following steps.

S301: An electronic device detects light brightness in a current environment.

S302: When the electronic device detects that the ambient light brightness is less than or equal to a first light brightness threshold, an actual frame rate that is output by the electronic device is a first frame rate.

It should be understood that the actual frame rate in this application is a frame rate at which a sensor (sensor) of the electronic device outputs frames.

For example, the first light brightness threshold is 1 lux. When the electronic device detects that the light brightness in the current environment is less than or equal to 1 lux, the electronic device may output an actual frame rate of 15 fps. In this case, exposure duration of each frame of image on the electronic device is 66.7 ms.

S303: The electronic device collects first video data based on the first frame rate by using a camera, where the first video data includes a plurality of frames of images.

S304: The electronic device performs frame interpolation on the plurality of frames of images, to obtain second video data, where a frame rate of the second video data is greater than the first frame rate.

In this embodiment of this application, the frame rate of the second video may also be referred to as a nominal frame rate. When the electronic device determines that the current ambient light brightness is less than 1 lux, the actual frame rate that is output by the electronic device may be 15 fps, exposure duration is 66.7 ms, and the nominal frame rate of the second video data may be 30 fps or 24 fps.

S305: The electronic device determines a relationship between the light brightness in the current environment and a second light brightness threshold.

S306: When the electronic device determines that the light brightness in the current environment is greater than or equal to the second light brightness threshold, the actual frame rate that is output by the electronic device is a second frame rate.

For example, the second light brightness threshold is 2 lux. When the electronic device detects that the light brightness in the current environment is greater than or equal to 2 lux, the electronic device may output an actual frame rate of 30 fps. In this case, exposure duration of each frame of image on the electronic device is 33.3 ms.

In this embodiment of this application, two thresholds are set, to reduce various sudden changes caused when ambient light brightness changes at a critical point, for example, sudden changes of image brightness and noise caused by a sudden decrease of exposure duration. Frame dropping is performed when the light brightness is less than or equal to the first light brightness threshold, and frame dropping is stopped when the light brightness is greater than or equal to the second light brightness threshold. This ensures flapping between frame dropping and no frame dropping.

If the electronic device determines, in S305, that the light brightness in the current environment is less than the second light brightness threshold, the electronic device continues to perform the foregoing steps S303 and S304.

S307: The electronic device collects third video data based on the second frame rate by using the camera, where a nominal frame rate of the third video data is equal to the second frame rate.

In this embodiment of this application, in an extremely dark scenario (for example, light brightness is less than 1 lux), the electronic device collects video data based on the actual frame rate by using the camera, and may perform frame interpolation on the video data, so that a frame rate of a video can be improved. This can improve fluency when the user watches the video.

Figure 4:
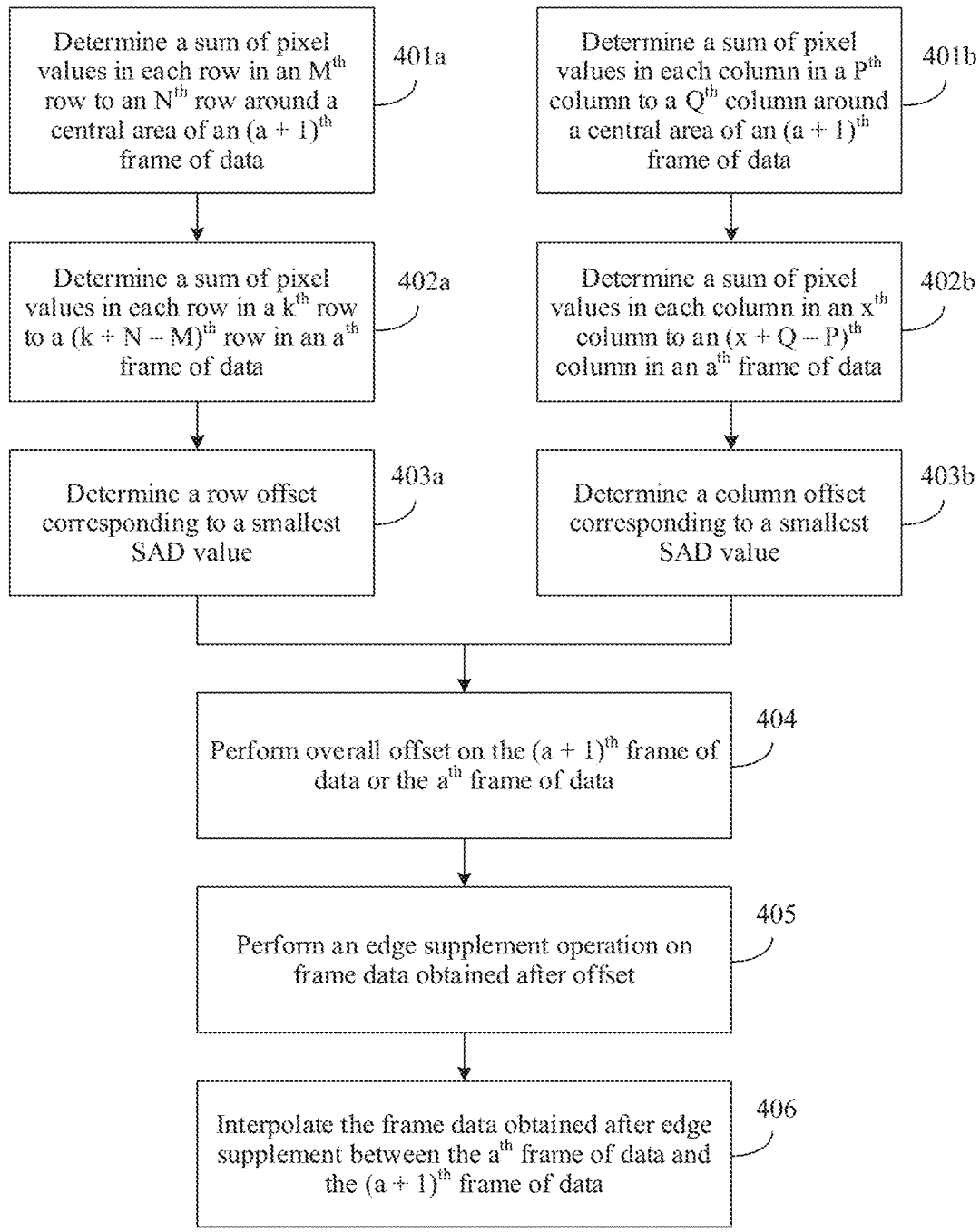
FIG. 4 shows a procedure of a frame interpolation algorithm according to an embodiment of this application.
Figure 5A:
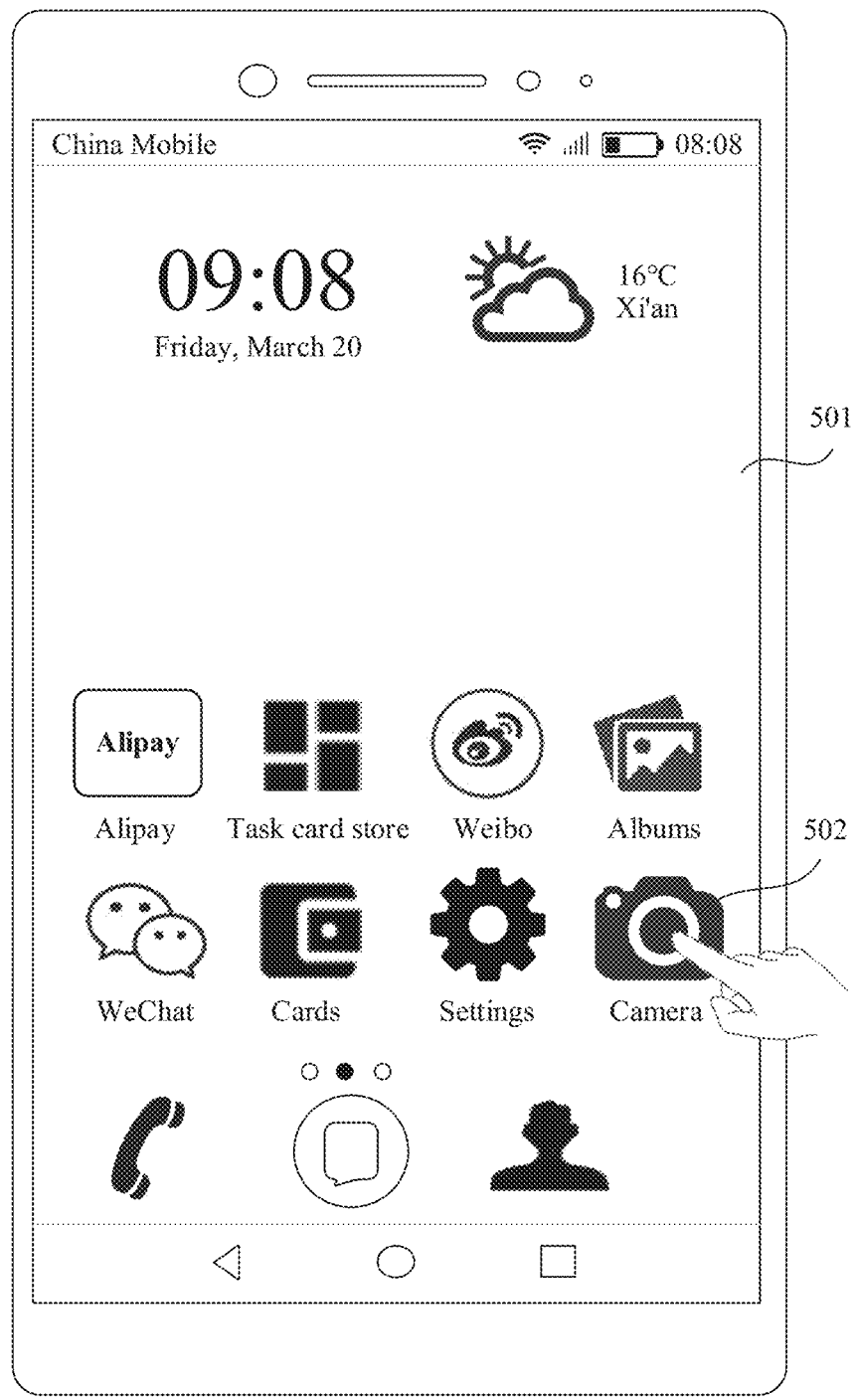
FIG. 5(a) to FIG. 5(d) show a group of GUIs according to an embodiment of this application.
Figure 5B:
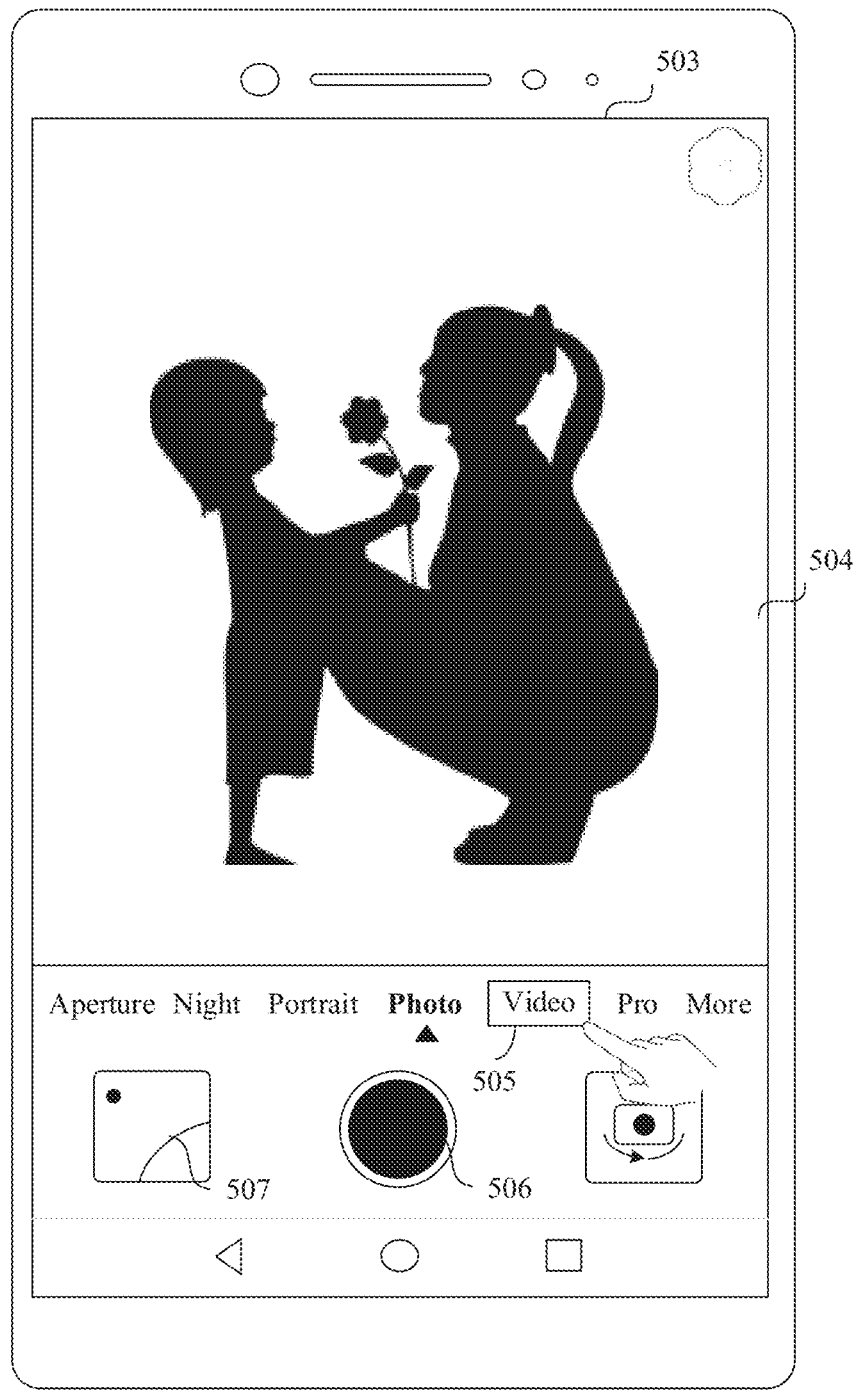
Figure 5C:
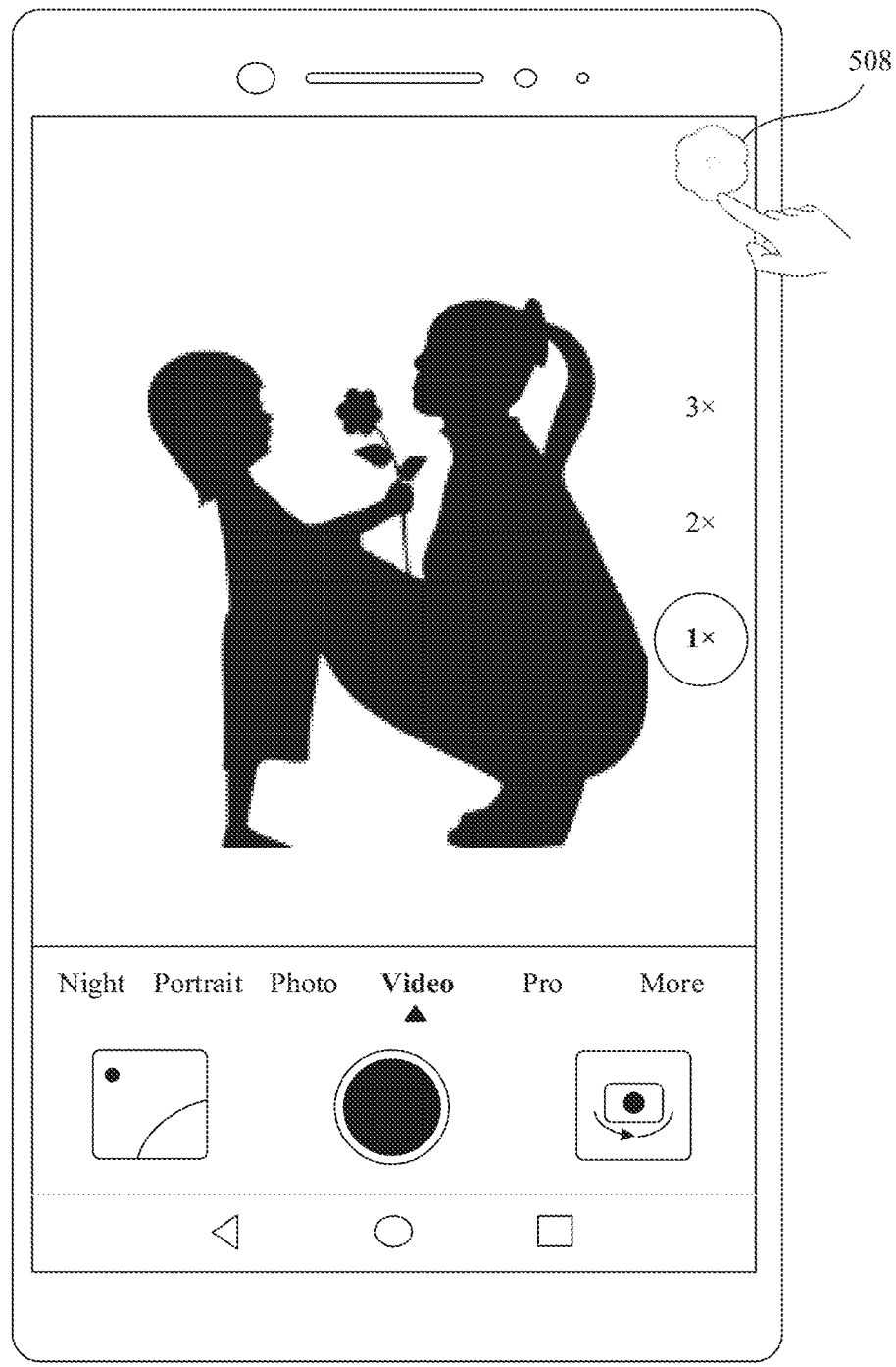
Figure 5D:
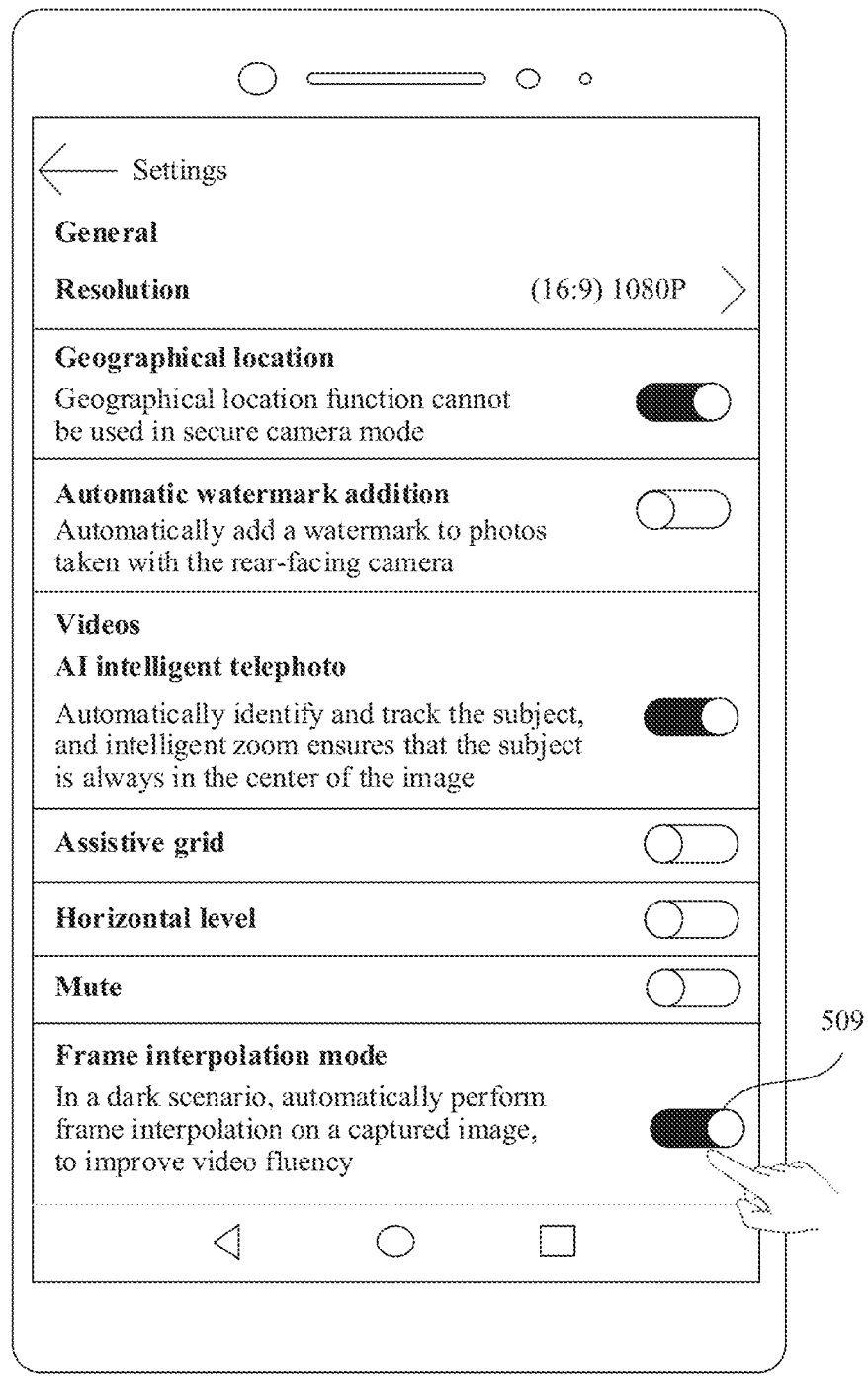

FIG. 4 shows a procedure of a frame interpolation algorithm according to an embodiment of this application. The following provides descriptions by using an example in which frame interpolation is performed between an $a^{th}$ frame and an $(a+1)^{th}$ frame, where a is a positive integer greater than or equal to 1.

In this embodiment of this application, for ease of understanding, an example in which data in each of the $a^{th}$ frame and the $(a+1)^{th}$ frame is a 10×10 pixel value matrix is used for description. It can be learned by a person skilled in the art that if resolution of a current screen is 1920×1080, the $a^{th}$ frame of data or the $(a+1)^{th}$ frame of data collected by a camera is a 1920×1080 pixel value matrix.

For example, the $a^{th}$ frame of data is:

$$\begin{pmatrix} 2 & 3 & 7 & 8 & 1 & 4 & 0 & 4 \\ 3 & 7 & 1 & 9 & 5 & 6 & 3 & 2 \\ 6 & 5 & 3 & 3 & 4 & 5 & 5 & 7 \\ 4 & 6 & 8 & 7 & 2 & 4 & 9 & 0 \\ 5 & 6 & 1 & 6 & 4 & 3 & 8 & 4 \\ 6 & 8 & 2 & 5 & 4 & 4 & 5 & 7 \\ 5 & 8 & 3 & 5 & 6 & 1 & 0 & 2 \\ 5 & 8 & 3 & 5 & 7 & 9 & 2 & 1 \end{pmatrix}$$

Each element in the matrix represents a pixel value. In this embodiment of this application, for ease of description, an example in which the pixel value ranges from 0 to 9 is used for description. In an actual case, a value range of the pixel value may be 0 to 255.

For example, the $(a+1)^{th}$ frame of data is:

$$\begin{pmatrix} 3 & 5 & 8 & 4 & 2 & 6 & 3 & 2 \\ 3 & 2 & 3 & 9 & 0 & 3 & 5 & 7 \\ 2 & 1 & 8 & 3 & 6 & 2 & 4 & 5 \\ 3 & 5 & 2 & 1 & 4 & 4 & 8 & 7 \\ 6 & 5 & 2 & 1 & 7 & 9 & 2 & 3 \\ 8 & 2 & 1 & 5 & 4 & 6 & 7 & 2 \\ 4 & 7 & 7 & 1 & 3 & 5 & 2 & 4 \\ 1 & 4 & 5 & 6 & 3 & 2 & 8 & 7 \end{pmatrix}$$

Step 401a: Determine a sum of pixel values in each row in an $M^{th}$ row to an $N^{th}$ row around a central area of the $(a+1)^{th}$ frame of data.

Because the central area of the $(a+1)^{th}$ frame of data is the fourth row or the fifth row, the fourth row or the fifth row may be selected as the central area of the $(a+1)^{th}$ frame of data. The following provides descriptions by using an example in which the fourth row is selected as the central area.

When the $M^{th}$ row to the $N^{th}$ row around the central area are selected, several rows above the central area and several rows below the central area may be selected. For example, two rows above the central area and two rows below the central area may be selected, that is, the second row to the sixth row are selected. A sum of pixel values in the second row is 32, a sum of pixel values in the third row is 31, a sum of pixel values in the fourth row is 34, a sum of pixel values in the fifth row is 35, and a sum of pixel values in the sixth row is 35.

Step 402a: Determine a sum of pixel values in each row in a $k^{th}$ row to a $(k+N-M)^{th}$ row in the $a^{th}$ frame of data, where k is a positive integer greater than or equal to 1, k≤L, and L is a specified maximum row offset.

For example, because data in the second row to the sixth row is selected from the $(a+1)^{th}$ frame of data, when a row is selected from the $a^{th}$ frame of data, a 0-row upward offset may be selected, that is, data in the second row to the sixth row in the $a^{th}$ frame of data is selected; or a 1-row upward offset may be selected, that is, data in the first row to the fifth row in the $a^{th}$ frame of data is selected, where 1 is also a maximum search offset for upward offset.

For example, when the upward offset is 0 rows, a sum of pixel values in the second row that may be selected in the $a^{th}$ frame of data is 36, a sum of pixel values in the third row is 38, a sum of pixel values in the fourth row is 40, a sum of pixel values in the fifth row is 37, and a sum of pixel values in the sixth row is 41.

For another example, when the upward offset is 1 row, a sum of pixel values in the first row that may be selected in the $a^{th}$ frame of data is 29, a sum of pixel values in the second row is 36, a sum of pixel values in the third row is 38, a sum of pixel values in the fourth row is 40, and a sum of pixel values in the fifth row is 37.

For example, when a row is selected from the $a^{th}$ frame of data, a 1-row or 2-row downward offset may be selected, where 2 is a maximum search offset for downward offset.

For example, when the downward offset is 1 row, a sum of pixel values in the third row that may be selected in the atm frame of data is 38, a sum of pixel values in the fourth row is 40, a sum of pixel values in the fifth row is 37, a sum of pixel values in the sixth row is 41, and a sum of pixel values in the seventh row is 30.

For example, when the downward offset is 2 rows, a sum of pixel values in the fourth row that may be selected in the $a^{th}$ frame of data is 40, a sum of pixel values in the fifth row is 37, a sum of pixel values in the sixth row is 41, a sum of pixel values in the seventh row is 30, and a sum of pixel values in the eighth row is 40.

Step 403a: Successively calculate a difference between the sum that is obtained in step 402a and that is of the pixel values in each row in a matrix from the $k^{th}$ row to the $(k+N-M)^{th}$ row and the sum that is obtained in step 401a and that is of the pixel values in each row, to obtain a sum of absolute differences (SAD), and determine a row offset corresponding to a smallest SAD value.

For example, when the upward offset is 0 rows in step 402a, an absolute difference between the sum of the pixel values in the second row in the $a^{th}$ frame of data and the sum of the pixel values in the second row in the $(a+1)^{th}$ frame of data is 4; an absolute difference between the sum of the pixel values in the third row in the $a^{th}$ frame of data and the sum of the pixel values in the third row in the $(a+1)^{th}$ frame of data is 7; an absolute difference between the sum of the pixel values in the fourth row in the $a^{th}$ frame of data and the sum of the pixel values in the fourth row in the $(a+)^{th}$ frame of data is 6; an absolute difference between the sum of the pixel values in the fifth row in the $a^{th}$ frame of data and the sum of the pixel values in the fifth row in the $(a+1)^{th}$ frame of data is 2; and an absolute difference between the sum of the pixel values in the sixth row in the $a^{th}$ frame of data and the sum of the pixel values in the sixth row in the $(a+1)$th frame of data is 6. Then, when the upward offset is 0 rows, the SAD value is 25.

For example, when the upward offset is 1 row in step 402a, an absolute difference between the sum of the pixel values in the first row in the $a^{th}$ frame of data and the sum of the pixel values in the second row in the $(a+1)^{th}$ frame of data is 3; an absolute difference between the sum of the pixel values in the second row in the $a^{th}$ frame of data and the sum of the pixel values in the third row in the $(a+1)^{th}$ frame of data is 5; an absolute difference between the sum of the pixel values in the third row in the $a^{th}$ frame of data and the sum of the pixel values in the fourth row in the $(a+1)^{th}$ frame of data is 4; an absolute difference between the sum of the pixel values in the fourth row in the $a^{th}$ frame of data and the sum of the pixel values in the fifth row in the $(a+1)^{th}$ frame of data is 5; and an absolute difference between the sum of the pixel values in the fifth row in the $a^{th}$ frame of data and the sum of the pixel values in the sixth row in the $(a+1)^{th}$ frame of data is 2. Then, when the upward offset is 1 row, the SAD value is 19.

For example, when the downward offset is 1 row in step 402a, an absolute difference between the sum of the pixel values in the third row in the $a^{th}$ frame of data and the sum of the pixel values in the second row in the $(a+1)^{th}$ frame of data is 6; an absolute difference between the sum of the pixel values in the fourth row in the $a^{th}$ frame of data and the sum of the pixel values in the third row in the $(a+1)^{th}$ frame of data is 9; an absolute difference between the sum of the pixel values in the fifth row in the $a^{th}$ frame of data and the sum of the pixel values in the fourth row in the $(a+1)^{th}$ frame of data is 3; an absolute difference between the sum of the pixel values in the sixth row in the $a^{th}$ frame of data and the sum of the pixel values in the fifth row in the $(a+1)$th frame of data is 6; and an absolute difference between the sum of the pixel values in the seventh row in the $a^{th}$ frame of data and the sum of the pixel values in the sixth row in the $(a+1)^{th}$ frame of data is 5. Then, when the downward offset is 1 row, the SAD value is 29.

For example, when the downward offset is 2 rows in step 402a, an absolute difference between the sum of the pixel values in the fourth row in the $a^{th}$ frame of data and the sum of the pixel values in the second row in the $(a+1)^{th}$ frame of data is 8; an absolute difference between the sum of the pixel values in the fifth row in the $a^{th}$ frame of data and the sum of the pixel values in the third row in the $(a+1)^{th}$ frame of data is 6; an absolute difference between the sum of the pixel values in the sixth row in the $a^{th}$ frame of data and the sum of the pixel values in the fourth row in the $(a+1)^{th}$ frame of data is 7; an absolute difference between the sum of the pixel values in the seventh row in the $a^{th}$ frame of data and the sum of the pixel values in the fifth row in the $(a+1)^{th}$ frame of data is 5; and an absolute difference between the sum of the pixel values in the eighth row in the $a^{th}$ frame of data and the sum of the pixel values in the sixth row in the $(a+1)^{th}$ frame of data is 5. Then, when the downward offset is 2 rows, the SAD value is 31.

Based on the foregoing SAD values, it can be determined that the SAD value is the smallest when the upward offset is 1 row.

Similarly, a column offset may be determined according to steps 401b to 403b.

Step 401b: Determine a sum of pixel values in each column in a $P^{th}$ column to a $Q$ column around a central area of the $(a+1)^{th}$ frame of data.

Because the central area of the $(a+1)^{th}$ frame of data is the fourth column or the fifth column, the fourth column or the fifth column may be selected as the central area of the $(a+1)^{th}$ frame of data. The following provides descriptions by using an example in which the fourth column is selected as the central area.

When the $P^{th}$ column to the $Q^{th}$ column around the central area are selected, several columns on the left of the central area and several columns on the right of the central area may be selected. For example, two columns on the left of the central area and two columns on the right of the central area may be selected, that is, the second column to the sixth column are selected. A sum of pixel values in the second column is 31, a sum of pixel values in the third column is 36, a sum of pixel values in the fourth column is 30, a sum of pixel values in the fifth column is 29, and a sum of pixel values in the sixth column is 37.

It should be understood that a quantity of columns selected in step 401b may be the same as or different from a quantity of rows selected in step 401a. For example, in step 401b, one column on the left of the central area (the fourth column) and one column on the right of the central area may be alternatively selected, that is, the third column to the fifth column are selected.

Step 402b: Determine a sum of pixel values in each column in an $x^{th}$ column to an $(x+Q-P)^{th}$ column in the $a^{th}$ frame of data, where x is a positive integer greater than or equal to 1, $x \leq Y$, and Y is a specified maximum column offset.

For example, because data in the second column to the sixth column is selected from the $(a+1)^{th}$ frame of data, when a column is selected from the a frame of data, a 0-column leftward offset may be selected, that is, data in the second column to the sixth column in the $a^{th}$ frame of data is selected; or a 1-column leftward offset may be selected, that is, data in the first column to the fifth column in the $a^{th}$ frame of data is selected, where 1 is also a maximum column offset for leftward offset.

For example, when the leftward offset is 0 columns, a sum of pixel values in the second column that may be selected in the at frame of data is 51, a sum of pixel values in the third column is 28, a sum of pixel values in the fourth column is 48, a sum of pixel values in the fifth column is 31, and a sum of pixel values in the sixth column is 36.

For another example, when the leftward offset is 1 column, a sum of pixel values in the first column that may be selected in the $a^{th}$ frame of data is 36, a sum of pixel values in the second column is 51, a sum of pixel values in the third column is 28, a sum of pixel values in the fourth column is 48, and a sum of pixel values in the fifth column is 31.

For example, when a column is selected from the $a^{th}$ frame of data, a 1-column or 2-column rightward offset may be selected, where 2 is a maximum column offset for rightward offset.

For example, when the rightward offset is 1 column, a sum of pixel values in the third column that may be selected in the ah frame of data is 28, a sum of pixel values in the fourth column is 48, a sum of pixel values in the fifth column is 31, a sum of pixel values in the sixth column is 36, and a sum of pixel values in the seventh column is 32.

For example, when the rightward offset is 2 rows, a sum of pixel values in the fourth column that may be selected in the $a^{th}$ frame of data is 48, a sum of pixel values in the fifth column is 31, a sum of pixel values in the sixth column is 36, a sum of pixel values in the seventh column is 32, and a sum of pixel values in the eighth column is 27.

Step 403b: Successively calculate a difference between the sum that is obtained in step 402b and that is of the pixel values in each column in a matrix from the $x^{th}$ column to the $(x+Q-P)^{th}$ column and the sum that is obtained in step 401b and that is of the pixel values in each column, to obtain a sum of absolute differences (SAD), and determine a column offset corresponding to a smallest SAD value.

For example, when the leftward offset is 0 columns in step 402b, an absolute difference between the sum of the pixel values in the second column in the $a^{th}$ frame of data and the sum of the pixel values in the second column in the $(a+1)^{th}$ frame of data is 20; an absolute difference between the sum of the pixel values in the third column in the $a^{th}$ frame of data and the sum of the pixel values in the third column in the $(a+1)^{th}$ frame of data is 8; an absolute difference between the sum of the pixel values in the fourth column in the $a^{th}$ frame of data and the sum of the pixel values in the fourth column in the $(a+1)$th frame of data is 18; an absolute difference between the sum of the pixel values in the fifth column in the $a^{th}$ frame of data and the sum of the pixel values in the fifth column in the $(a+1)^{th}$ frame of data is 2; and an absolute difference between the sum of the pixel values in the sixth column in the $a^{th}$ frame of data and the sum of the pixel values in the sixth column in the $(a+1)^{th}$ frame of data is 1. Then, when the leftward offset is 0 columns, the SAD value is 49.

For example, when the leftward offset is 1 column in step 402b, an absolute difference between the sum of the pixel values in the first column in the $a^{th}$ frame of data and the sum of the pixel values in the second column in the $(a+1)^{th}$ frame of data is 5; an absolute difference between the sum of the pixel values in the second column in the $a^{th}$ frame of data and the sum of the pixel values in the third column in the $(a+1)^{th}$ frame of data is 15; an absolute difference between the sum of the pixel values in the third column in the $a^{th}$ frame of data and the sum of the pixel values in the fourth column in the $(a+1)^{th}$ frame of data is 2; an absolute difference between the sum of the pixel values in the fourth column in the $a^{th}$ frame of data and the sum of the pixel values in the fifth column in the $(a+1)^{th}$ frame of data is 19; and an absolute difference between the sum of the pixel values in the fifth column in the $a^{th}$ frame of data and the sum of the pixel values in the sixth column in the $(a+1)^{th}$ frame of data is 6. Then, when the leftward offset is 1 column, the SAD value is 47.

For example, when the rightward offset is 1 column in step 402b, an absolute difference between the sum of the pixel values in the third column in the $a^{th}$ frame of data and the sum of the pixel values in the second column in the $(a+1)^{th}$ frame of data is 3; an absolute difference between the sum of the pixel values in the fourth column in the $a^{th}$ frame of data and the sum of the pixel values in the third column in the $(a+1)^{th}$ frame of data is 12; an absolute difference between the sum of the pixel values in the fifth column in the $a^{th}$ frame of data and the sum of the pixel values in the fourth column in the $(a+1)^{th}$ frame of data is 1; an absolute difference between the sum of the pixel values in the sixth column in the a frame of data and the sum of the pixel values in the fifth column in the (a+1)th frame of data is 7; and an absolute difference between the sum of the pixel values in the seventh column in the $a^{th}$ frame of data and the sum of the pixel values in the sixth column in the (a+1)th frame of data is 5. Then, when the rightward offset is 1 column, the SAD value is 28.

For example, when the rightward offset is 2 columns in step 402b, an absolute difference between the sum of the pixel values in the fourth column in the $a^{th}$ frame of data and the sum of the pixel values in the second column in the $(a+1)^{th}$ frame of data is 17; an absolute difference between the sum of the pixel values in the fifth column in the $a^{th}$ frame of data and the sum of the pixel values in the third column in the $(a+1)^{th}$ frame of data is 5; an absolute difference between the sum of the pixel values in the sixth column in the $a^{th}$ frame of data and the sum of the pixel values in the fourth column in the $(a+1)^{th}$ frame of data is 6; an absolute difference between the sum of the pixel values in the seventh column in the $a^{th}$ frame of data and the sum of the pixel values in the fifth column in the $(a+1)^{th}$ frame of data is 3; and an absolute difference between the sum of the pixel values in the eighth column in the $a^{th}$ frame of data and the sum of the pixel values in the sixth column in the $(a+1)^{th}$ frame of data is 10. Then, when the downward offset is 2 columns, the SAD value is 41.

Based on the foregoing SAD values, it can be determined that the SAD value is the smallest when the rightward offset is 1 column.

It should be understood that, in this embodiment of this application, when the row offset and the column offset are determined, an offset corresponding to the smallest SAD value or an offset corresponding to another SAD value may be selected to determine the row offset and the column offset.

Step 404: Perform overall offset on the $(a+1)^{th}$ frame of data or the $a^{th}$ frame of data based on the row offset in step 403a and the column offset in step 403b.

For example, it can be learned from the foregoing description that, after an operation of 1-row upward offset and 1-column rightward offset is performed on the $(a+1)^{th}$ frame of image, frame data obtained after offset may be:

$$\begin{pmatrix} 0 & 3 & 2 & 3 & 9 & 0 & 3 & 5 \\ 0 & 2 & 1 & 8 & 3 & 6 & 2 & 4 \\ 0 & 3 & 5 & 2 & 1 & 4 & 4 & 8 \\ 0 & 6 & 5 & 2 & 1 & 7 & 9 & 2 \\ 0 & 8 & 2 & 1 & 5 & 4 & 6 & 7 \\ 0 & 4 & 7 & 7 & 1 & 3 & 5 & 2 \\ 0 & 1 & 4 & 5 & 6 & 3 & 2 & 8 \\ 0 & 0 & 0 & 0 & 0 & 0 & 0 & 0 \end{pmatrix}$$

Alternatively, a reverse offset operation may be performed on the $a^{th}$ frame of image. For example, after 1-row downward offset and 1-column leftward offset are performed on the $a^{th}$ frame of image, frame data obtained after offset may be:

$$\begin{pmatrix} 0 & 0 & 0 & 0 & 0 & 0 & 0 & 0 \\ 3 & 7 & 8 & 1 & 4 & 0 & 4 & 0 \\ 7 & 1 & 9 & 5 & 6 & 3 & 2 & 0 \\ 5 & 3 & 3 & 4 & 5 & 5 & 7 & 0 \\ 6 & 8 & 7 & 2 & 4 & 9 & 0 & 0 \\ 6 & 1 & 6 & 4 & 3 & 8 & 4 & 0 \\ 8 & 2 & 5 & 4 & 4 & 5 & 7 & 0 \\ 8 & 3 & 5 & 6 & 1 & 0 & 2 & 0 \end{pmatrix}$$

Step 405: Perform an edge supplement operation on the frame data obtained after offset.

After the offset, some edge pixel values are null, and the edge supplement operation needs to be performed. An edge abnormality may be processed through mirroring or stretching.

For example, the edge supplement operation may be performed through mirroring. Data in the seventh row of the frame data obtained after offset may be mirrored to the eighth row, and data in the second column may be mirrored to the first column, to obtain frame data obtained after edge supplement:

$$\begin{pmatrix} 3 & 3 & 7 & 1 & 9 & 5 & 6 & 3 \\ 6 & 6 & 7 & 3 & 3 & 4 & 5 & 5 \\ 4 & 4 & 6 & 8 & 7 & 2 & 4 & 9 \\ 5 & 5 & 6 & 1 & 6 & 4 & 3 & 8 \\ 6 & 6 & 8 & 2 & 5 & 4 & 4 & 5 \\ 5 & 5 & 8 & 3 & 5 & 6 & 1 & 0 \\ 5 & 5 & 8 & 3 & 5 & 7 & 9 & 2 \\ 0 & 5 & 8 & 3 & 5 & 7 & 9 & 2 \end{pmatrix}$$

In this embodiment of this application, the frame data obtained after offset may alternatively be stretched to process an edge abnormality. For example, it is assumed that the frame data obtained after offset is:

$$\begin{pmatrix} 0 & 0 & 100 & 254 & 136 & 171 & 247 & 185 \\ 0 & 0 & 38 & 98 & 128 & 53 & 215 & 97 \\ 0 & 0 & 124 & 64 & 28 & 58 & 68 & 242 \\ 0 & 0 & 142 & 185 & 62 & 73 & 152 & 174 \\ 0 & 0 & 63 & 93 & 164 & 185 & 203 & 72 \\ 0 & 0 & 74 & 85 & 96 & 156 & 238 & 54 \\ 0 & 0 & 0 & 0 & 0 & 0 & 0 & 0 \\ 0 & 0 & 0 & 0 & 0 & 0 & 0 & 0 \end{pmatrix}$$

In this case, a row may be first stretched to obtain frame data obtained after edge supplement:

$$\begin{pmatrix} 100 & 151 & 202 & 254 & 136 & 171 & 247 & 185 \\ 38 & 58 & 78 & 98 & 128 & 53 & 215 & 97 \\ 124 & 104 & 84 & 64 & 28 & 58 & 68 & 242 \\ 142 & 156 & 170 & 185 & 62 & 73 & 152 & 174 \\ 63 & 73 & 83 & 93 & 164 & 185 & 203 & 72 \\ 74 & 77 & 81 & 85 & 96 & 156 & 238 & 54 \\ 0 & 0 & 0 & 0 & 0 & 0 & 0 & 0 \\ 0 & 0 & 0 & 0 & 0 & 0 & 0 & 0 \end{pmatrix}$$

Then, a column is stretched to obtain frame data obtained after final edge supplement:

$$\begin{pmatrix} 100 & 151 & 202 & 254 & 136 & 171 & 247 & 185 \\ 38 & 58 & 78 & 98 & 128 & 53 & 215 & 97 \\ 124 & 104 & 84 & 64 & 28 & 58 & 68 & 242 \\ 142 & 156 & 170 & 185 & 62 & 73 & 152 & 174 \\ 63 & 73 & 83 & 93 & 164 & 185 & 203 & 72 \\ 66 & 75 & 82 & 91 & 142 & 176 & 214 & 66 \\ 70 & 76 & 82 & 88 & 119 & 166 & 226 & 60 \\ 74 & 77 & 81 & 85 & 96 & 156 & 238 & 54 \end{pmatrix}$$

It should be understood that, in this embodiment of this application, the operation in step 405 is optional.

In an embodiment, a sum of pixel values in each row in an $M^{th}$ row to an $N^{th}$ row around a central area of the $a^{th}$ frame of data may be alternatively selected in step 401a; a sum of pixel values in each row in a $k^{th}$ row to a $(k+N-M)^{th}$ row in the $(a+1)^{th}$ frame is determined in step 402a; and in step 403a, a difference between the sum of the pixel values in each row in a matrix from the $k^{th}$ row to the $(k+N-M)^{th}$ row in the $(a+1)^{th}$ frame of data and the sum of the pixel values in each row in the $N^{th}$ row to the $M^{th}$ row in the $a^{th}$ frame of data is successively calculated, and a row offset corresponding to a smallest SAD value is determined. In addition, a column offset corresponding to a smallest SAD value is obtained according to the foregoing steps. Finally, overall offset is performed on the $a^{th}$ frame of data based on the row offset and the column offset, to obtain frame data obtained after offset; or overall offset is performed on the $(a+1)^{th}$ frame of data based on reverse directions of the row offset and the column offset, to obtain frame data obtained after offset.

Step 406: Interpolate the frame data obtained after edge supplement between the $a^{th}$ frame of data and the $(a+1)^{th}$ frame of data, to improve video fluency.

FIG. 5(*a*) to FIG. 5(*d*) show a group of graphical user interfaces (graphical user interface, GUI) according to an embodiment of this application.

Refer to FIG. 5(*a*). The GUI is a home screen 501 of a mobile phone. After detecting an operation that a user taps an icon 502 of a camera application (application, APP) on the home screen 501, the mobile phone may start the camera application, and display a GUI shown in FIG. 5(*b*). The GUI may be referred to as a photographing interface 503. The photographing interface 503 may include a viewfinder 504. In a preview state, a preview image may be displayed in real time in the viewfinder 504. After the mobile phone detects that the user taps a photographing control 506, the mobile phone performs a photographing operation, and stores a shot photo. After detecting that the user taps an album icon 507, the mobile phone may display a shot photo, video, or the like on a touchscreen.

It may be understood that, after the mobile phone detects the operation that the user taps the icon 502, the mobile phone opens the camera application and the camera application is in a PHOTO mode by default. The GUI further includes modes such as a VIDEO mode, a PRO mode, and MORE. After detecting that the user taps an icon 405 of the VIDEO mode, the mobile phone displays a GUI shown in FIG. 5(*c*).

Refer to FIG. 5(*c*). The GUI is a video display interface. After the mobile phone detects an operation that the user taps a control 508, the mobile phone may display a GUI shown in FIG. 5(*d*).

Refer to FIG. 5(*d*). The GUI is a setting interface. The setting interface includes general settings and video settings. The general settings include setting options of resolution, a geographical location, and automatic watermark addition. The video settings include settings of AI intelligent telephoto, an assistive grid, a horizontal level, mute, and a frame interpolation mode. When the mobile phone detects an operation that the user taps a control 509 (enabling the frame interpolation mode), the mobile phone may automatically enable the frame interpolation mode during video shooting. In a dark scenario, the mobile phone may automatically perform frame interpolation on a captured image, to improve video fluency.

Figure 6A:
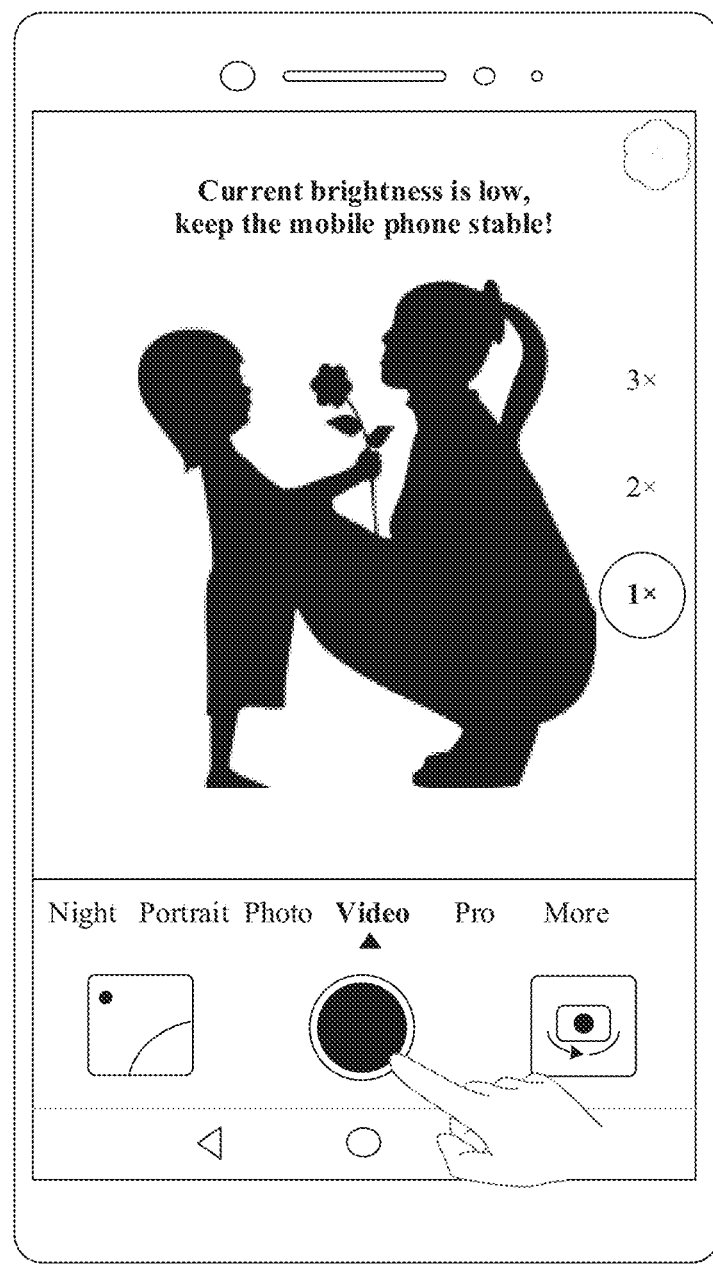
FIG. 6(a) to FIG. 6(c) show another group of GUIs according to an embodiment of this application.
Figure 6B:
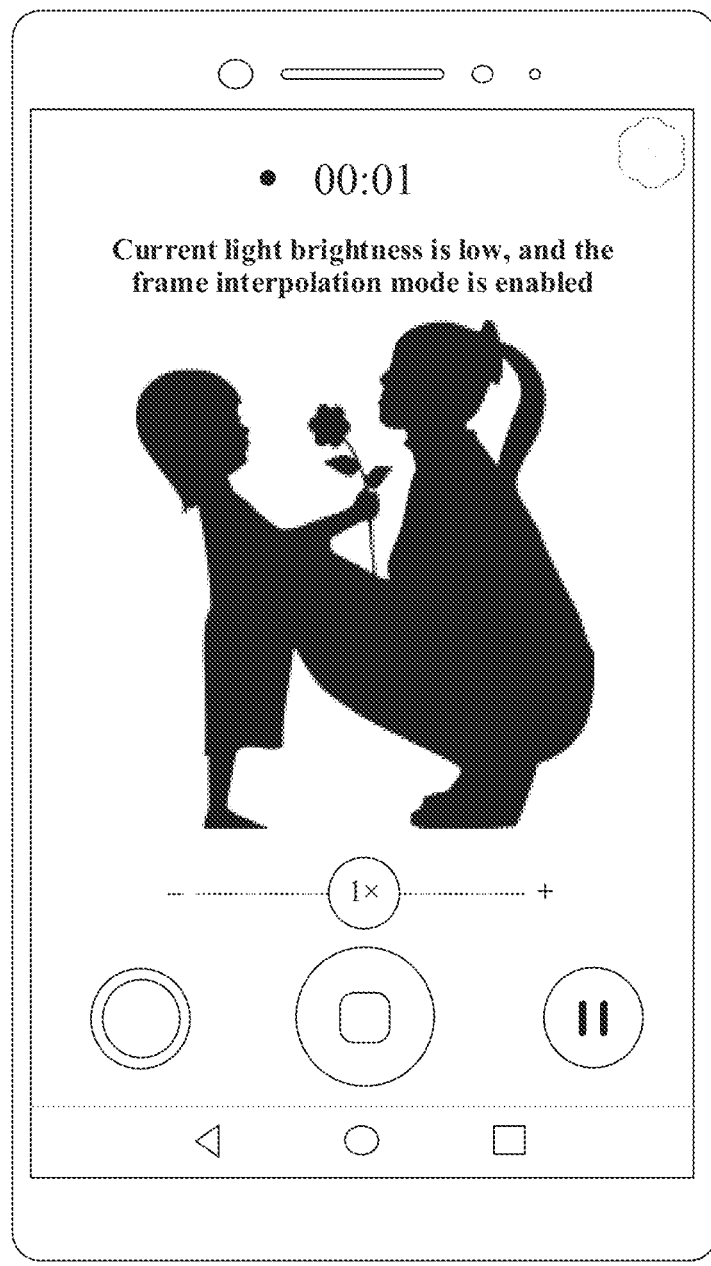

FIG. 6(*a*) to FIG. 6(*c*) show another group of GUIs according to an embodiment of this application.

Refer to FIG. 6(*a*). The GUI is a video display interface. After a mobile phone detects that current ambient light brightness is less than a first light brightness threshold, because an actual frame rate decreases to 15 fps, exposure duration of each frame of image increases to 66.7 ms. The exposure duration increase makes a moving track of an object in each frame of image become longer. This increases a possibility of an intra-frame blur. The mobile phone may prompt, through a display, a user that "current brightness is low, keep the mobile phone stable". After detecting an operation that the user taps a photographing control 506, the mobile phone may display a GUI shown in FIG. 6(*b*).

Refer to FIG. 6(*b*). The GUI is another video display interface. After the mobile phone detects the operation that the user taps the photographing control 506, the mobile phone starts recording a video. Because the current ambient light brightness is less than the first light brightness threshold, the mobile phone may automatically enable a frame interpolation mode, collect video data based on an actual frame rate (for example, 15 fps), and perform frame interpolation on the collected video data, to improve video fluency. As shown in FIG. 6(*b*), the mobile phone may further prompt, by using an interface, the user that "current light brightness is low, and the frame interpolation mode is enabled". In this way, a nominal frame rate (for example, 30 fps or 24 fps) of video data actually stored in the mobile phone is greater than the actual frame rate.

Figure 6C:
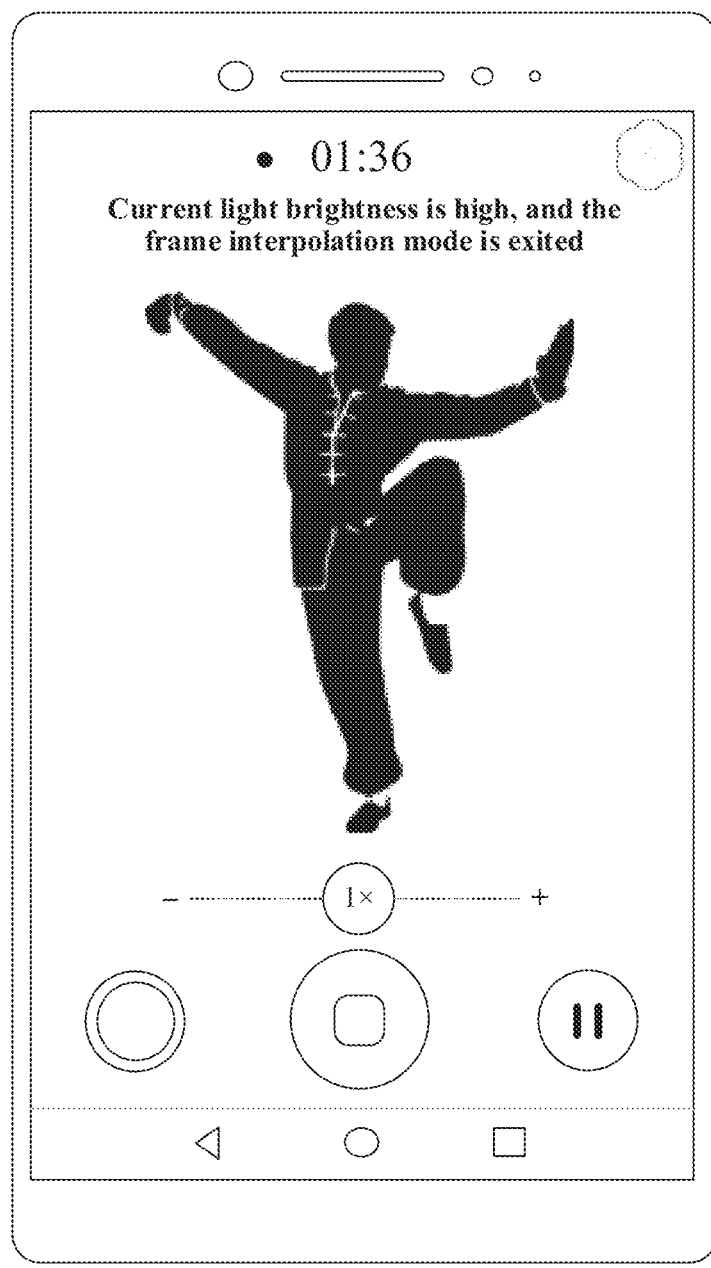

Refer to FIG. 6(*c*). The GUI is another video display interface. In a video shooting process of the mobile phone, if the mobile phone detects that current ambient light brightness is greater than or equal to a second light brightness threshold, the actual frame rate that is output by the mobile phone increases (for example, increases from 15 fps to 30 fps). In this case, because the actual frame rate can meet a video fluency requirement, the mobile phone may not perform frame interpolation on video data collected based on the actual frame rate. As shown in FIG. 6(c), the mobile phone may prompt, through the display, the user that "current light brightness is high, and the frame interpolation mode is exited".

It should be understood that, in this embodiment of this application, when the mobile phone is in a video preview interface, before the mobile phone starts recoding a video, if the mobile phone detects that light brightness is less than the first light brightness threshold, the mobile phone may enable the frame interpolation mode in the preview interface. In this way, even if the light brightness is relatively low, fluency of images seen by the user in the video preview interface is relatively high. Alternatively, the mobile phone may not enable the frame interpolation mode in the video preview interface, but the frame interpolation mode is automatically enabled if it is detected, in the video recording process, that the light brightness is less than the first light brightness threshold.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, function units in embodiments of this application may be integrated into one processing unit, each of the units may exist alone physically, or two or more units may be integrated into one unit.

When the functions are implemented in the form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An image processing method implemented by an electronic device, wherein the image processing method comprises:

detecting ambient light brightness in a current environment;

outputting a first frame rate when the ambient light brightness is less than or equal to a first preset light brightness threshold;

collecting, based on the first frame rate, first video data comprising a plurality of frames of images;

performing frame interpolation on the frames of images to obtain second video data, wherein a second frame rate of the second video data is greater than the first frame rate, wherein the frames of images comprise an $a^{th}$ frame of image data and an $(a+1)^{th}$ frame of image data, wherein each of the $a^{th}$ frame of image data and the $(a+1)^{th}$ frame of image data is a W×Z matrix, wherein a, W, and Z are positive integers, and wherein performing the frame interpolation comprises:

determining L sum of absolute differences (SAD) values based on a first sum of first pixel values in each row in an $M^{th}$ row to an $N^{th}$ row in the $(a+1)^{th}$ frame of image data and a second sum of second pixel values in each row in a $k^{th}$ row to a $(k+N-M)^{th}$ row in the $a^{th}$ frame of image data, wherein M and N are positive integers, wherein $1 \leq M < N \leq W$, wherein k=1, . . . , or L, and wherein L is a maximum row offset;

determining Y SAD values based on a third sum of third pixel values in each column in a $P^{th}$ column to a $Q^{th}$ column in the $(a+1)^{th}$ frame of image data and a fourth sum of fourth pixel values in each column in an $x^{th}$ column to an $(x+Q-P)^{th}$ column in the $a^{th}$ frame of image data, wherein P and Q are positive integers, wherein $1 < P < Q \leq Z$, wherein x=1, . . . , or Y, and wherein Y is a maximum column offset;

determining a first row offset and a first column offset based on the L SAD values and the Y SAD values;

processing the $a^{th}$ frame of image data or the $(a+1)^{th}$ frame of image data based on the first row offset and the first column offset to obtain processed image data; and interpolating the processed image data between the $a^{th}$ frame of image data and the $(a+1)^{th}$ frame of image data; and storing the second video data.

2. The image processing method of claim 1, further comprising:

determining a second row offset corresponding to a first smallest value in the L SAD values as the first row offset; and determining a second column offset corresponding to a second smallest value in the Y SAD values as the first column offset.

3. The image processing method of claim 1, wherein before obtaining the processed image data, the image processing method further comprises performing an edge supplement on data obtained after offset.

4. The image processing method of claim 1, further comprising:

outputting a third frame rate when the ambient light brightness is greater than or equal to a second preset light brightness threshold, wherein the third frame rate is greater than the first frame rate;

collecting third video data using a camera based on the third frame rate, wherein a fourth frame rate of the third video data is equal to the third frame rate; and storing the third video data.

5. The image processing method of claim 4, wherein the second preset light brightness threshold is greater than the first preset light brightness threshold.

6. An electronic device comprising:

a camera;

a sensor; and one or more processors coupled to the camera and the sensor and configured to:

detect ambient light brightness in a current environment;

output a first frame rate using the sensor when the ambient light brightness is less than or equal to a first preset light brightness threshold;

collect, using the camera based on the first frame rate, first video data comprising a plurality of frames of images;

perform frame interpolation on the frames of images to obtain second video data, wherein a second frame rate of the second video data is greater than the first frame rate, wherein the frames of images comprise an $a^{th}$ frame of image data and an $(a+1)^{th}$ frame of image data, wherein each of the $a^{th}$ frame of image data and the $(a+1)^{th}$ frame of image data is a W×Z matrix, wherein a, W, and Z are positive integers, and wherein the one or more processors are further configured to:

determine L sum of absolute differences (SAD) values based on a first sum of first pixel values in each row in an $M^{th}$ row to an $N^{th}$ row in the $(a+1)^{th}$ frame of image data and a second sum of second pixel values in each row in a $k^{th}$ row to a $(k+N-M)^{th}$ row in the $a^{th}$ frame of image data, wherein M and N are positive integers, wherein $1 \leq M < N \leq W$, wherein k=1 ..., or L, and wherein L is a maximum row offset;

determine Y SAD values based on a third sum of third pixel values in each column in a $P^{th}$ column to a $Q^{th}$ column in the $(a+1)^{th}$ frame of image data and a fourth sum of fourth pixel values in each column in an $x^{th}$ column to an $(x+Q-P)^{th}$ column in the $a^{th}$ frame of image data, wherein P and Q are positive integers, wherein $1 < P < Q < Z$, wherein x=1, ..., or Y, and wherein Y is a maximum column offset;

determine a first row offset and a first column offset based on the L SAD values and the Y SAD values;

process the $a^{th}$ frame of image data or the $(a+1)^{th}$ frame of image data based on the first row offset and the first column offset to obtain processed image data; and interpolate the processed image data between the $a^{th}$ frame of image data and the $(a+1)^{th}$ frame of image data; and store the second video data.

7. The electronic device of claim 6, wherein the one or more processors are further configured to:

determine a second row offset corresponding to a first smallest value in the L SAD values as the first row offset; and determine a second column offset corresponding to a second smallest value in the Y SAD values as the first column offset.

8. The electronic device of claim 6, wherein before obtaining the processed image data, the one or more processors are further configured to perform an edge supplement on data obtained after offset to obtain the processed image data.

9. The electronic device of claim 6, wherein the one or more processors are further configured to:

output a third frame rate using the sensor when detecting that the ambient light brightness is greater than or equal to a second preset light brightness threshold, wherein the third frame rate is greater than the first frame rate;

collect third video data using the camera based on the third frame rate, wherein a fourth frame rate of the third video data is equal to the third frame rate; and store the third video data.

10. The electronic device of claim 9, wherein the second preset light brightness threshold is greater than the first preset light brightness threshold.

11. The electronic device of claim 8, wherein before performing the edge supplement on the data obtained after offset, the one or more processors are further configured to perform offset on the $(a+1)^{th}$ frame of image data based on the first row offset and the first column offset to obtain the data obtained after offset.

12. The electronic device of claim 8, wherein before performing the edge supplement on the data obtained after offset, the one or more processors are further configured to perform reverse offset on the $a^{th}$ frame of image data based on the first row offset and the first column offset to obtain the data obtained after offset.

13. A computer program product comprising computer-executable instructions that are stored on a non-transitory computer-readable medium and that, when executed by a processor, cause an electronic device to:

detect ambient light brightness in a current environment;

output a first frame rate when the ambient light brightness is less than or equal to a first preset light brightness threshold;

collect, based on the first frame rate, first video data comprising a plurality of frames of images;

perform frame interpolation on the frames of images to obtain second video data, wherein a second frame rate of the second video data is greater than the first frame rate, wherein the frames of images comprise an $a^{th}$ frame of image data and an $(a+1)^{th}$ frame of image data, wherein each of the $a^{th}$ frame of image data and the $(a+1)^{th}$ frame of image data is a W×Z matrix, wherein a, W, and Z are positive integers, and wherein the computer-executable instructions further cause the electronic device to:

determine L sum of absolute differences (SAD) values based on a first sum of first pixel values in each row in an $M^{th}$ row to an $N^{th}$ row in the $(a+1)^{th}$ frame of image data and a second sum of second pixel values in each row in a $k^{th}$ row to a $(k+N-M)^{th}$ row in the $a^{th}$ frame of image data, wherein M and N are positive integers, wherein 1<M<N<W, wherein k=1, . . . , or L, and wherein L is a maximum row offset;

determine Y SAD values based on a third sum of third pixel values in each column in a $P^{th}$ column to a $Q^{th}$ column in the $(a+1)^{th}$ frame of image data and a fourth sum of fourth pixel values in each column in an $x^{th}$ column to an $(x+Q-P)^{th}$ column in the $a^{th}$ frame of image data, wherein P and Q are positive integers, wherein 1<P<Q<Z, wherein x=1, . . . or Y, and wherein Y is a maximum column offset;

determine a first row offset and a first column offset based on the L SAD values and the Y SAD values;

process the $a^{th}$ frame of image data or the $(a+1)^{th}$ frame of image data based on the first row offset and the first column offset to obtain processed image data; and interpolate the processed image data between the $a^{th}$ frame of image data and the $(a+1)^{th}$ frame of image data; and store the second video data.

14. The computer program product of claim 13, wherein the computer-executable instructions further cause the electronic device to:

determine a second row offset corresponding to a first smallest value in the L SAD values as the first row offset; and determine a second column offset corresponding to a second smallest value in the Y SAD values as the first column offset.

15. The computer program product of claim 13, wherein before obtaining the processed image data, the computer-executable instructions further cause the electronic device to perform an edge supplement on data obtained after offset.

16. The computer program product of claim 13, wherein the computer-executable instructions further cause the electronic device to:

output a third frame rate when the ambient light brightness is greater than or equal to a second preset light brightness threshold, wherein the third frame rate is greater than the first frame rate;

collect third video data using a camera based on the third frame rate, wherein a fourth frame rate of the third video data is equal to the third frame rate; and store the third video data.

17. The computer program product of claim 16, wherein the second preset light brightness threshold is greater than the first preset light brightness threshold.

18. The computer program product of claim 15, wherein before obtaining the processed image data, the computer-executable instructions further cause the electronic device to interpolate the data obtained after the edge supplement between the $a^{th}$ frame of data and the $(a+1)^{th}$ frame of data.

19. The image processing method of claim 3, wherein before obtaining the processed image data, the image processing method further comprises interpolating the data obtained after the edge supplement between the $a^{th}$ frame of data and the $(a+1)^{th}$ frame of data.

20. The electronic device of claim 8, wherein before obtaining the processed image data, the one or more processors are further configured to interpolate the data obtained after the edge supplement between the $a^{th}$ frame of data and the $(a+1)^{th}$ frame of data.

* * * * *

UNITED STATES PATENT AND TRADEMARK OFFICE
CERTIFICATE OF CORRECTION

PATENT NO. : 12,430,875 B2
APPLICATION NO. : 17/914141
DATED : September 30, 2025
INVENTOR(S) : Chen et al.

Page 1 of 1

It is certified that error appears in the above-identified patent and that said Letters Patent is hereby corrected as shown below:

On the Title Page

Page 2, (56) References Cited, Foreign Patent Documents, Line 10: "CN 2020005042 A1 1/2020" should read "WO 2020005042 A1 1/2020"

In the Claims

Claim 1, Column 22, Line 64: "1<P<Q<Z" should read "$1 \leq P < Q \leq Z$"

Claim 6, Column 24, Line 5: "1<P<Q<Z" should read "$1 \leq P < Q \leq Z$"

Claim 13, Column 25, Line 14: "1<M<N<W" should read "$1 \leq M < N \leq W$"

Claim 13, Column 24, Line 22: "1<P<Q<Z" should read "$1 \leq P < Q \leq Z$"

Signed and Sealed this
Ninth Day of December, 2025

John A. Squires
*Director of the United States Patent and Trademark Office*